(12) United States Patent
Hirakawa et al.

(10) Patent No.: US 9,296,350 B2
(45) Date of Patent: Mar. 29, 2016

(54) ULTRASONIC WAVE DEVICE

(71) Applicant: PANASONIC CORPORATION, Osaka (JP)

(72) Inventors: Osamu Hirakawa, Mie (JP); Yasushi Nagano, Mie (JP); Takashi Tsuji, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/282,851

(22) Filed: May 20, 2014

(65) Prior Publication Data

US 2014/0346303 A1  Nov. 27, 2014

(30) Foreign Application Priority Data

May 23, 2013 (JP) ................................. 2013-109367

(51) Int. Cl.
| | |
|---|---|
| *A47F 5/00* | (2006.01) |
| *B60R 19/48* | (2006.01) |
| *G01S 7/521* | (2006.01) |
| *G10K 11/00* | (2006.01) |
| *G01S 15/93* | (2006.01) |

(52) U.S. Cl.
CPC ............... *B60R 19/483* (2013.01); *G01S 7/521* (2013.01); *G10K 11/004* (2013.01); *G01S 15/931* (2013.01); *G01S 2015/938* (2013.01)

(58) Field of Classification Search
CPC ...... F16M 13/02; B23P 17/04; B60R 19/483; G01S 15/931; G01S 7/521; G01S 2015/938; G10K 11/004
See application file for complete search history.

(56) References Cited

U.S. PATENT DOCUMENTS 8,897,025 B2 * 11/2014 Urase et al. ................... 361/752
2012/0056043 A1   3/2012 Inoue et al.

FOREIGN PATENT DOCUMENTS

| JP | 4056568 B2 | 3/2008 |
|---|---|---|
| WO | 98/52067 A2 | 11/1998 |
| WO | 98/52067 A3 | 2/1999 |

OTHER PUBLICATIONS

Extended European Search Report issued in European Patent Application No. 14168679.0 dated Apr. 7, 2015.

* cited by examiner

*Primary Examiner* — Amy Sterling
(74) *Attorney, Agent, or Firm* — McDermott Will & Emery LLP (57) ABSTRACT

An ultrasonic wave device includes a holding member designed to be fixed to an inner surface of a bumper as a vehicle outer panel, and a body block designed to be connected with the holding member. The body block includes a head designed to be inserted in an exposing hole provided at the bumper, and at least one abutting part designed to abut on the inner surface of the bumper at a position closer to the exposing hole than a position where the holding member is fixed. The body block is biased to an outer side of the bumper by a spring force of the clamping part, which is a biasing part provided with the holding member.

13 Claims, 8 Drawing Sheets

FIG. 16          PRIOR ART

ULTRASONIC WAVE DEVICE

CROSS REFERENCE TO RELATED APPLICATIONS

This application claims priority to Japanese Patent Application No. 2013-109367 filed on May 23, 2013, the entire contents of which are incorporated by reference herein.

TECHNICAL FIELD

The disclosure relates generally to ultrasonic wave devices, and more particularly, to an ultrasonic wave device attached to a vehicle and configured to perform at least one of transmission and reception of ultrasonic waves.

BACKGROUND ART

In the past, there has been proposed an ultrasonic wave device which is configured to transmit ultrasonic waves and receive ultrasonic waves reflected by an obstacle. This kind of ultrasonic wave device, for example, detects presence or absence of an obstacle on the basis of information whether the ultrasonic wave device has received a reflected wave which was generated due to reflection of a transmitted ultrasonic wave by the obstacle. Moreover, this kind of the ultrasonic wave device, for example, detects a distance to the obstacle on the basis of the time from transmitting the ultrasonic wave to receiving the reflected wave (for example, JP 4056568 B2).

Figure 15:
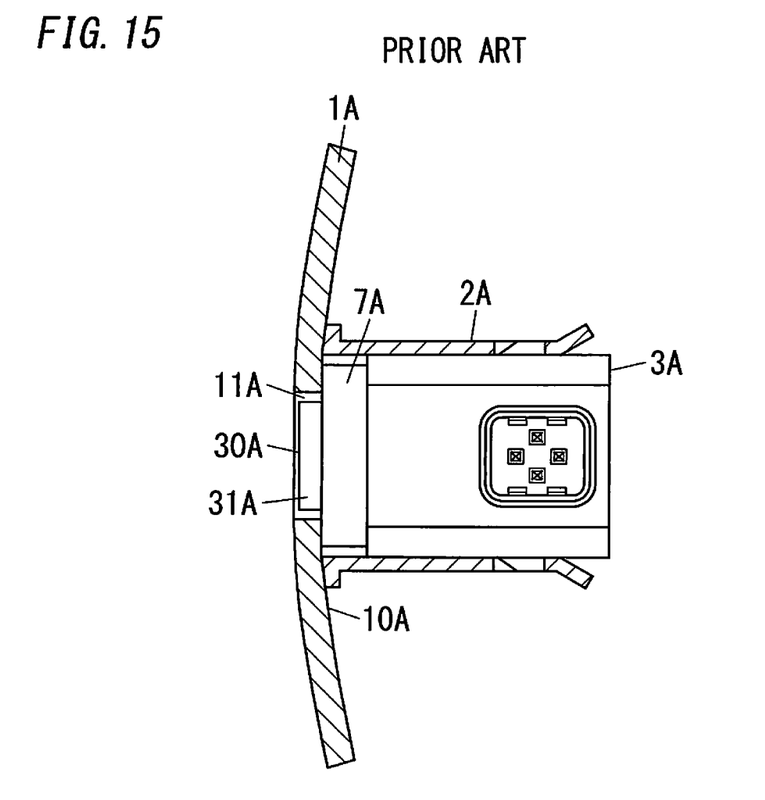
FIG. 15 is a front view partially broken away showing a conventional ultrasonic wave device.
Figure 16:
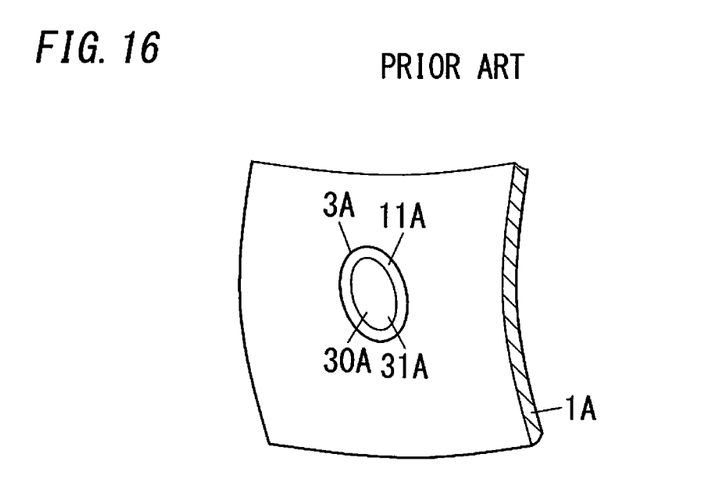
FIG. 16 is a perspective view partially broken away showing a state as viewed from outside a bumper to which the conventional ultrasonic wave device is attached.

The ultrasonic wave device mentioned above is used by being attached to a bumper 1A of a vehicle, as shown in FIG. 15 and FIG. 16.

In detail, the ultrasonic wave device mentioned above includes a holding member 2A designed to be fixed to an inner surface of the bumper 1A by gluing or welding, and a body block 3A. The body block 3A has an exposed surface 30A through which ultrasonic waves are input and output, and is held in the holding member 2A. The bumper 1A has an exposing hole 11A that exposes the exposed surface 30A of the body block 3A, and the body block 3A includes a head 31A including the exposed surface 30A and designed to be inserted into the exposing hole 11A. A dimension and a shape of the head 31A are designed so that the exposed surface 30A is to be flush with an outer surface of the bumper 1A, as shown in FIG. 16.

However, when a periphery of the exposing hole 11A is curved in the bumper 1A, a positional relationship between a portion of the holding member 2A abutting on the bumper 1A (a mounting surface) and an opening surface of the exposing hole 11A changes depending on a degree of curvature of the periphery. Thereafter, a holding ring 7A interposed between the body block 3A and the bumper 1A becomes deformed and a depth of insertion of the head 31A to the exposing hole 11A changes. Hence, the exposed surface 30A becomes not to be flush with the outer surface of the bumper 1A, and it affects an appearance.

For example, when the bumper 1A is curved so as to swell a vicinity of the exposing hole 11A outward, the portion of the holding member 2A abutting on the bumper 1A becomes positioned further inward from an opening of the exposing hole 11A in a normal direction of the exposed surface 30A, and the exposed surface 30A thereby becomes more depressed than a case in which the bumper 1A is flat. Conversely, when the bumper 1A is curved so as to hollow an outer surface of the vicinity of the exposing hole 11A, the portion of the holding member 2A abutting on the bumper 1A becomes positioned further outward from the opening of the exposing hole 11A in the normal direction of the exposed surface 30A, and the exposed surface 30A thereby becomes more protruded than the case in which the bumper 1A is flat.

SUMMARY OF THE INVENTION

Hence, it is an object of the present technology to provide an ultrasonic wave device of which a depth of insertion of a head to an exposing hole is not easily affected by a form of a mounting surface.

An ultrasonic wave device according to an aspect of the present invention includes: a holding member designed to be fixed to an inner surface of a vehicle outer panel; and a body block designed to be connected with the holding member. The body block includes: a head designed to be inserted in an exposing hole which is a thorough hole provided at the vehicle outer panel; at least one abutting part designed to abut on the inner surface of the vehicle outer panel at a position closer to the exposing hole than a position where the holding member is fixed; and at least one of a receiving part and a transmitting part. The receiving part is provided at the head and configured to receive ultrasonic waves incident from an exposed surface which is exposed thorough the exposing hole. The transmitting part is provided at the head and configured to transmit ultrasonic waves from the exposed surface. The holding member includes a biasing part designed to bias the body block to an outer side of the vehicle outer panel.

According to the aspect of the invention, because the body block including the head designed to be inserted in an exposing hole is provided with the at least one abutting part abutting on the vehicle outer panel at a position closer to the exposing hole than a position where the holding member is fixed, and the at least one abutting part is pressed to the inner surface of the vehicle outer panel by an action of the biasing part, the depth of insertion of the head to the exposing hole is not easily affected by the form of a mounting surface, in compared with an ultrasonic wave device that does not include the at least one abutting part or the biasing part.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Embodiments will be described below, with reference to the drawings.

First Embodiment

Figure 1:
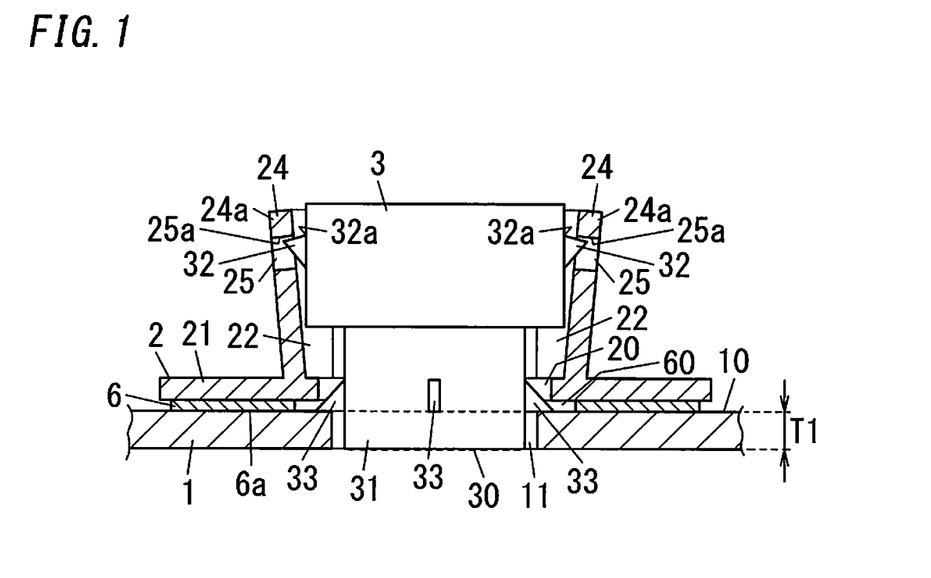
FIG. 1 is a front view partially broken away showing a state in which an ultrasonic wave device according to a first embodiment is fixed to a bumper.
Figure 2:
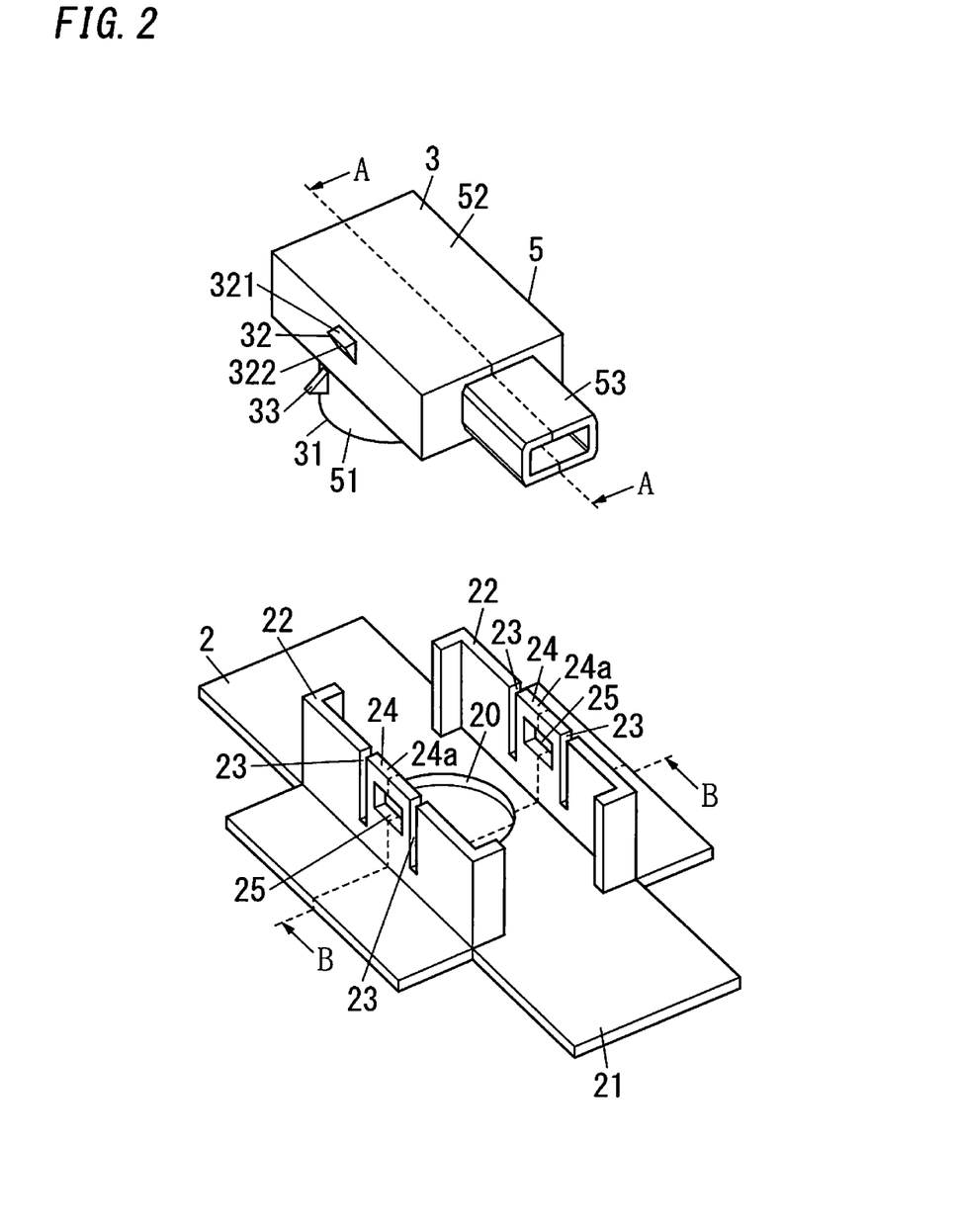
FIG. 2 is a perspective view showing a state in which a body block in the ultrasonic wave device according to the first embodiment is not fixed to a holding member.

An ultrasonic wave device according to the present embodiment includes, as shown in FIG. 1 and FIG. 2, a holding member 2 designed to be fixed to an inner surface of a bumper 1 as a vehicle outer panel, and a body block 3 designed to be connected with and disconnected from the holding member 2 freely.

Hereinafter, an upward and downward direction (a first direction) and a left and right direction (a second direction) of the ultrasonic wave device are based on directions in FIG. 1, and a direction intersecting the first direction and the second direction is referred to as a forward and rearward direction (a third direction). That is, a normal direction of an exposed surface 30 mentioned below and a thickness direction of the bumper 1 correspond to the upward and downward direction (the first direction). Further in detail, in the first direction, a direction in which ultrasonic waves are emitted from the exposed surface 30 is referred to as a first side of the first direction, and a direction in which reflected waves are incident to the exposed surface 30 is referred to as a second side of the first direction. Moreover, in the thickness direction of the bumper 1, an inner side at which the ultrasonic wave device is disposed is referred to as an upper side, and an outer side is referred to as a lower side. The aforementioned directions are defined in view of convenience of the explanation, and in practice, the upward and downward direction (the first direction) in above definition is often oriented to a horizontal direction (for example, a front side or a back side of a vehicle). Namely, when the bumper 1 to which the ultrasonic wave device is attached is disposed at the front side of a vehicle, the first direction of the ultrasonic wave device corresponds to a forward and rearward direction of the vehicle and the second direction corresponds to a left and right direction of the vehicle. In this case, the front side of the vehicle corresponds to the first side of the first direction, and the back side of the vehicle corresponds to the second side of the first direction.

Figure 3:
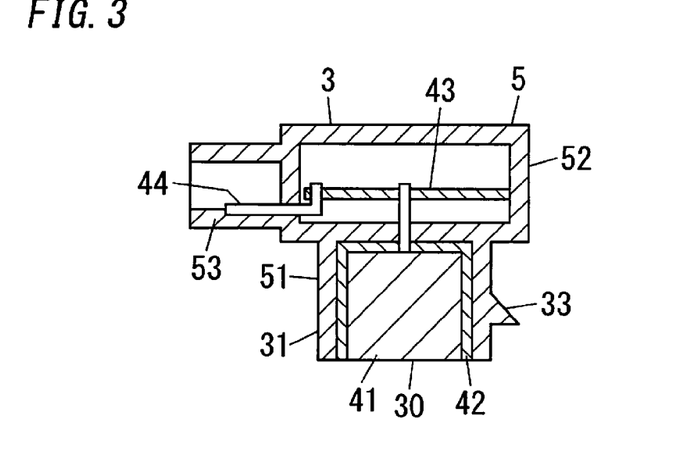
FIG. 3 is a cross-sectional view taken along a line A-A of FIG. 2 showing the body block in the ultrasonic wave device according to the first embodiment.

The body block 3 includes, as shown in FIG. 3, an ultrasonic wave microphone 41, a holding rubber 42 attached so as to cover the ultrasonic wave microphone 41, a printed wiring board 43, and a plurality of contacts 44 (only one shown). The ultrasonic wave microphone 41 and a contact 44 are configured to be electrically connected with a circuit provided at the printed wiring board 43.

The ultrasonic wave microphone 41 includes, for example, a case with one end in an axial direction open and formed in a bottomed cylindrical shape, and a piezoelectric element fixed to an inner bottom surface of the case. In the case mentioned above, sealing materials (for example, silicone rubbers) are filled. The piezoelectric element mentioned above is configured to convert inputted electrical signals into ultrasonic waves and transmit the ultrasonic waves via the exposed surface 30 (a lower surface of the ultrasonic wave microphone 41), and convert ultrasonic waves received via the exposed surface 30 into electrical signals. That is, the ultrasonic wave microphone 41 serves as a transmitting part configured to transmit ultrasonic waves as well as a receiving part configured to receive ultrasonic waves.

The holding rubber 42 is formed in a bottomed cylindrical shape, and covers the ultrasonic wave microphone 41 so as to expose the exposed surface 30. The holding rubber 42 is formed of well-known elastomers.

A signal processing circuit (not shown) is mounted on the printed wiring board 43. The signal processing circuit is configured to perform appropriate signal processing such as noise removal and amplifying for electric inputted and outputted between an external circuit (not shown) attached to the contact 44 and the piezoelectric element described above. The signal processing circuit described above can be realized with conventional techniques, and therefore no detailed description and drawings thereof are deemed necessary.

The body block 3 further includes a housing 5. The housing 5 is designed to hold the ultrasonic wave microphone 41, the holding rubber 42, the printed wiring board 43 and the contact 44 mentioned above. The housing 5 includes a microphone holding part 51 formed in a cylindrical shape with an axial direction thereof oriented to the upward and downward direction (the first direction) and designed to hold the ultrasonic wave microphone 41 with the holding rubber 42 therebetween. That is, the microphone holding part 51 constitutes a head 31 formed in a columnar shape with the ultrasonic wave microphone 41 and the holding rubber 42. In the head 31, an axial direction thereof is overall oriented to the upward and downward direction (the first direction), and a lower surface (the first side surface of the first direction) corresponds to the exposed surface 30.

The housing 5 further includes a circuit holding part 52 which is formed in a rectangular shape with a lower surface thereof connected to an upper end of the microphone holding part 51 and designed to hold the printed wiring board 43 in a state where a thickness direction thereof is oriented to the upward and downward direction (the first direction).

The housing 5 further includes a contact holding part 53 which is formed in a tubular shape and protruded from a side surface of the circuit holding part 52. The contact holding part 53 is designed to cover the plurality of contacts 44. In the contact holding part 53, a plug (not shown) is designed to be inserted therein. The plug includes a plurality of contacts configured to conduct the electricity to the plurality of contacts 44, respectively. That is, the contact holding part 53 constitutes a receptacle with the plurality of contacts 44. The receptacle constitutes a well-known connector with the plug mentioned above.

The holding member 2 is formed of synthetic resin into a plate shape, for example, and includes a fixing part 21 and a pair of holding parts 22 and 22. The fixing part 21 is fixed to an inner surface of the bumper 1 (a mounting surface 10) in a state where a thickness direction thereof is oriented to the upward and downward direction (the first direction). The holding parts 22 and 22 are designed to project upward from the fixing part 21 and hold the body block 3 so as to clamp the circuit holding part 52 of the housing 5 from both left and right sides (both sides in the second direction).

Figure 4:
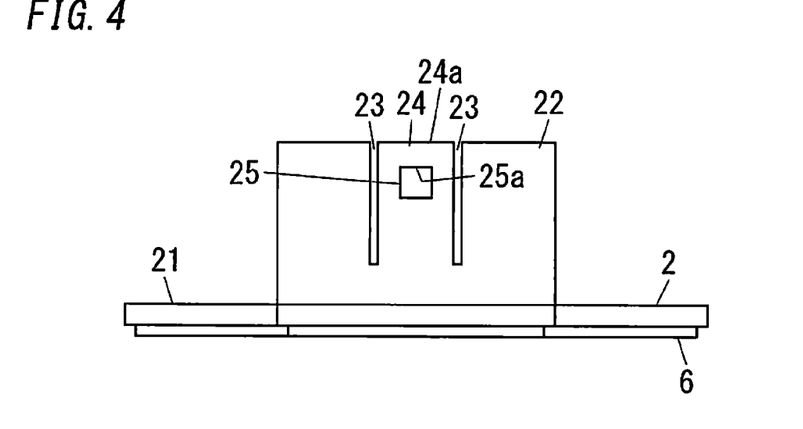
FIG. 4 is a left side view showing a state in which a sticking sheet is stuck to the holding member in the ultrasonic wave device according to the first embodiment.
Figure 5:
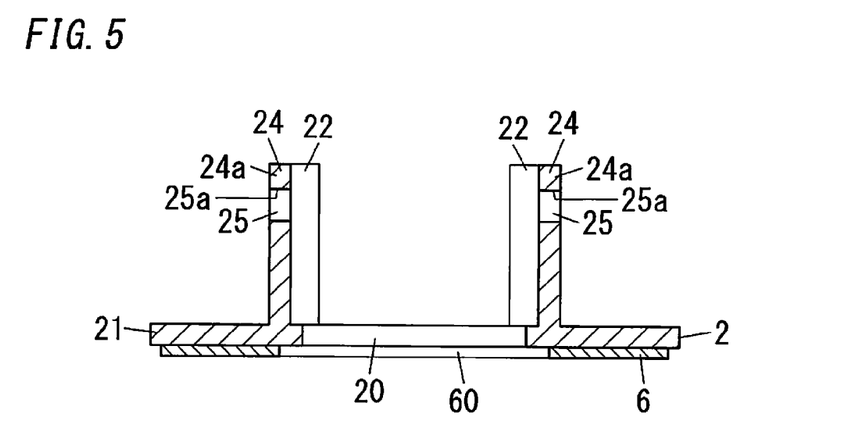
FIG. 5 is a cross-sectional view taken along a line B-B of FIG. 2 showing a state in which the sticking sheet is stuck to the holding member in the ultrasonic wave device according to the first embodiment.
Figure 6:
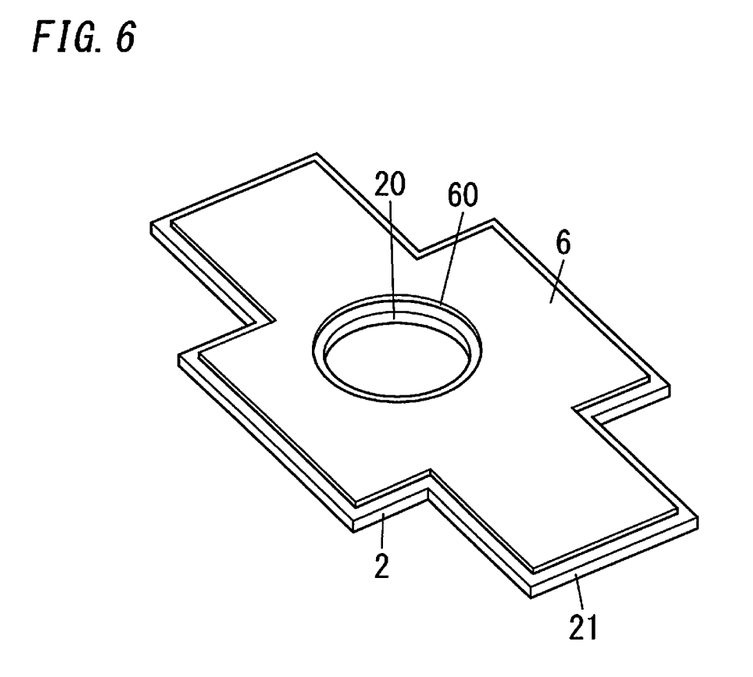
FIG. 6 is a perspective view showing a main part in a state where the sticking sheet is stuck to the holding member in the ultrasonic wave device according to the first embodiment.

The fixing part 21 is formed in a cross shape when viewed in the first direction, and has a insertion hole 20 formed in a circular shape at a center thereof. The head 31 of the body block 3 is designed to be inserted in the insertion hole 20. The fixing part 21 is, as shown in FIG. 4 to FIG. 6 for example, stuck (fixed) to the inner surface of the bumper 1 (an upper surface, namely the mounting surface 10) by a sticking sheet 6 stuck to a lower surface thereof. The sticking sheet 6 has a thorough hole 60 which is bigger than the insertion hole 20 so as to avoid the insertion hole 20.

Each holding part 22 includes, as shown in FIG. 4, a clamping part 24 (a biasing part) which is separated from other parts of a holding part 22 by two slits 23 formed thereon. The clamping part 24 is designed to be able to be elastically deformed so as to displace an upper end part 24a in the left and right direction (the second direction).

In the housing 5, an engagement projection 32 is designed to project outward in the left and right direction (the second direction) at each left and right side (both sides in the second direction) of the circuit holding part 52. Moreover, each of the clamping parts 24 has an engagement hole 25 in which the engagement projection 32 is engaged. The engagement hole 25 is formed as a thorough hole penetrating the clamping part 24 in the left and right direction (the second direction).

Figure 10:
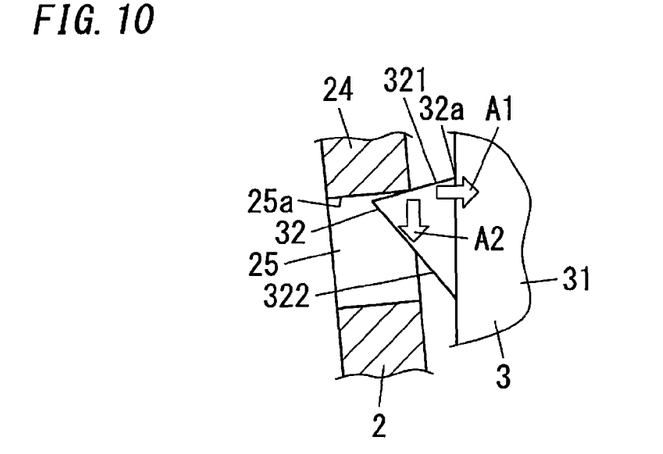
FIG. 10 is a front view partially broken away showing a main part of the ultrasonic wave device according to the first embodiment.

Each of the engagement projections 32 is, as shown in FIG. 2 and FIG. 10 for example, overall formed in a triangular cross-sectional shape. Each of the engagement projections 32 is provided with an inclined surface (hereinafter referred to as "a first inclined surface") 321 at an upper side (the second side of the first direction) thereof, and provided with an inclined surface (hereinafter referred to as "a second inclined surface") 322 at a lower side (the first side of the first direction) thereof. The first inclined surface 321 is formed so that a projecting dimension of the engagement projection 32 becomes smaller as a surface of the first inclined surface 321 goes upward (the second side of the first direction). Moreover, the second inclined surface 322 is formed so that the projecting dimension of the engagement projection 32 becomes smaller as a surface of the second inclined surface 322 goes downward (the first side of the first direction). A lower end of the first inclined surface 321 is continuous to an upper end of the second inclined surface 322.

When the body block 3 is held by the holding member 2, the body block 3 is pressed between clamping parts 24 from above in a state where each of the engagement projections 32 is positioned at an above of a corresponding engagement hole 25. Thereafter, the clamping parts 24 become elastically deformed so as to enlarge a distance between upper ends thereof, with the second inclined surface 322 of each engagement projection 32 brought into sliding contact with an upper end of the clamping part 24. Consequently, when a lower end of the first inclined surface 321 of each engagement projection 32 reaches the engagement hole 25, each of the clamping parts 24 becomes restored and each of the engagement projections 32 becomes engaged in the engagement hole 25. At this stage, an attachment of the body block 3 to the holding member 2 becomes completed. When removing the body block 3 from the holding member 2, it is possible to remove the body block 3 from the holding member 2 with the clamping part 24 elastically deformed by pulling the body block 3 upward.

Figure 7:
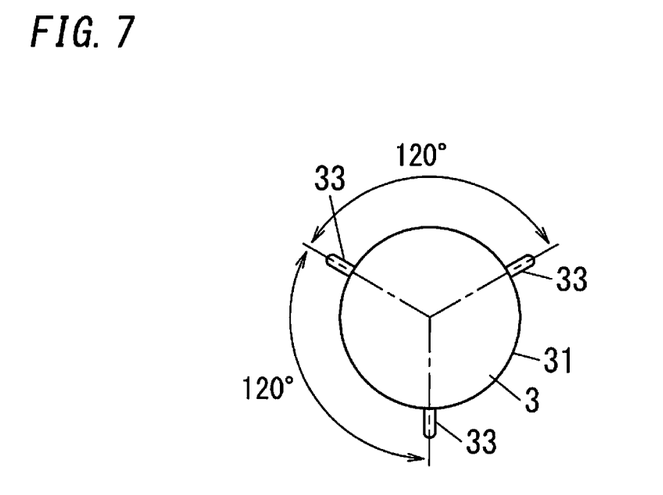
FIG. 7 is an explanatory drawing showing a layout of abutting parts in the ultrasonic wave device according to the first embodiment.

Moreover, the body block 3 is provided at an outer peripheral surface of the head 31 with three abutting parts 33 projecting. The three abutting parts 33 are designed to abut on an inner surface of the bumper 1 (the upper surface, namely the mounting surface 10) at an inside of the insertion hole 20 (namely, a position closer to an exposing hole 11 than a position where the holding member 2 is fixed) (see FIG. 1). The insertion hole 20 of the holding member 2 is formed to be large enough not to interfere with the abutting parts 33. Each of the abutting parts 33 is formed continuously and integrally with the microphone holding part 51 of the housing 5. Further, each of the abutting parts 33 is formed in a same shape, and arranged in equal intervals (namely at every 120 degrees) about a center axis of the head 31 as shown in FIG. 7. Accordingly, positions on which the abutting parts 33 are abutted in the inner surface of the bumper 1 are arranged at same intervals on one circle surrounding the head 31.

Figure 8A:
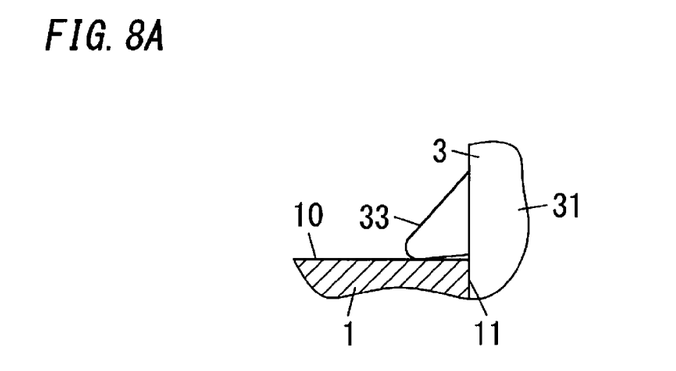
FIG. 8A is a right side view showing the abutting part in the ultrasonic wave device according to the first embodiment.
Figure 8B:
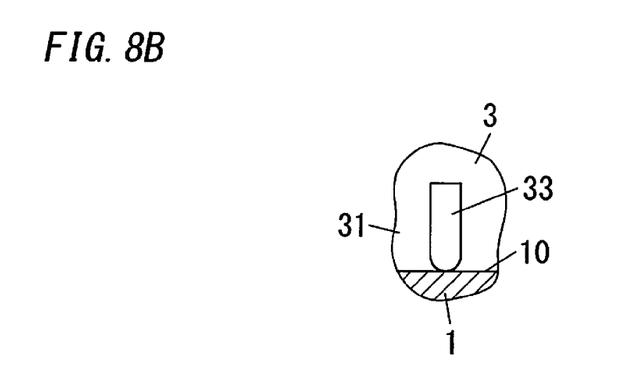
FIG. 8B is a front view showing the abutting part in the ultrasonic wave device according to the first embodiment.

As shown in FIG. 8A and FIG. 8B, a surface of each abutting part 33 abutting on the inner surface of the bumper 1 is formed in a spherical shape, and each of the abutting parts 33 is designed to abut on the bumper 1 at a point.

Figure 9:
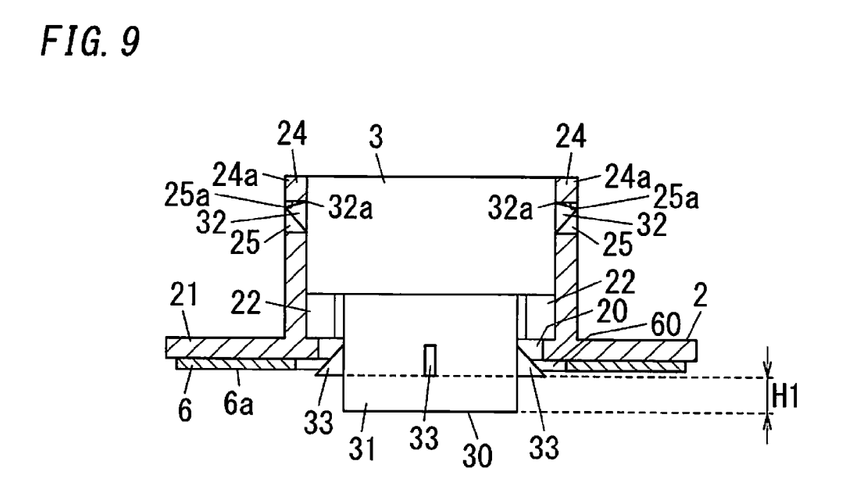
FIG. 9 is a front view partially broken away showing a state in which the body block is held in the holding member and each clamping part is completely elastically restored in the ultrasonic wave device according to the first embodiment.

Note that, when the holding member 2 is not yet fixed to the bumper 1, the ultrasonic wave device of the present embodiment is in a state where the body block 3 is held in the holding member 2 and each of the clamping parts 24 is elastically restored completely (hereinafter referred to as a first state) as shown in FIG. 9. That is, in the first state, an upper end 32a of each engagement projection 32 is positioned at the same place as an upper end 25a of the engagement hole 25 in the upward and downward direction (the first direction). Further, when the ultrasonic wave device of the present embodiment is in the first state, each of the abutting parts 33 is designed to project further downward (to the first side of the first direction) than a lower surface 6a (a surface abutting on the bumper 1) of the sticking sheet 6 as shown in FIG. 9.

On the other hand, when the holding member 2 is fixed to the bumper 1 by the sticking sheet 6, the ultrasonic wave device of the present embodiment is in a state where each of the clamping parts 24 is elastically deformed outward (hereinafter referred to as a second state) as shown in FIG. 1. In the second state, the upper end 32a of each engagement projection 32 is positioned at an upper side (the second side of the first direction) than the upper end 25a of the engagement hole 25, and each of the clamping parts 24 is designed to elastically abut on the first inclined surface 321 at an inner surface of the engagement hole 25. Accordingly, an elastic force (a restore force) of each clamping part 24 as shown by an arrow A1 in FIG. 10 becomes converted into a force biasing the body block 3 downward (namely, to the first side of the first direction; to an outside of the bumper 1) as shown by an arrow A2 by the first inclined surface 321. With this force, each of the abutting parts 33 is surely brought into abutting on the inner surface of the bumper 1 (the mounting surface 10). Thus, when a projecting dimension H1 (see FIG. 9) which is from a lower end of each abutting part 33 toward the exposed surface 30 is designed to be the same as an assumed thickness dimension T1 (see FIG. 1) of the bumper 1, it is possible to have the exposed surface 30 substantially flush with an outer surface of the bumper 1.

According to the structure mentioned above, each of the abutting parts 33 surely abuts on the inner surface of the bumper 1 by a spring force of the clamping part 24, and a position where the abutting part 33 is abutting is closer to the exposing hole 11 than a position where the holding member 2 is fixed. Thus, a depth of insertion of the head 31 to the exposing hole 11 and a position of the exposed surface 30 are not easily affected by a form of the bumper 1 (a form of the mounting surface 10), as compared with a case where the abutting part 33 is not provided.

Moreover, because the abutting part 33 is designed to abut on the bumper 1 only at part of the exposing hole 11 rather than the whole periphery thereof, even though there is a small projection (not shown) around the exposing hole 11, for example, the abutting part 33 is more likely to be able to abut only on a position avoiding the small projection. Thus, it is easy to stabilize an attitude of the body block 3 to the bumper 1, as compared with a case where the abutting part 33 is formed in an annular projection abutting on the bumper 1 in the whole periphery of the exposing hole 11.

Further, because the three abutting parts 33 are arranged at equal intervals on a circle surrounding the head 31, it is possible to stabilize the attitude of the body block 3 to the bumper 1, as compared with a case where abutting parts 33 are not arranged at equal intervals or a case where there are two abutting parts 33 or less.

Moreover, because the surface abutting on the bumper 1 in each abutting part 33 is formed in the spherical shape (namely, a curved surface), the surface abutting on the bumper 1 is not easily affected by unevenness of the bumper 1 (the mounting surface 10) as compared with a case where the surface abutting on the bumper 1 is formed in a plane shape, and thereby it is easy to stabilize the attitude of the body block 3 to the bumper 1.

Further, because each of the abutting parts 33 projects from the head 31 (the microphone holding part 51), it is possible to reduce the projecting dimension of each of the abutting parts 33 and secure a mechanical strength, as compared with a case where each of the abutting parts 33 projects from the circuit holding part 52, for example.

Second Embodiment

As shown in FIG. 11 to FIG. 14, an ultrasonic wave device according to the present embodiment is provided with three abutting parts 33A at an abutting member 35 which is different component from a housing 5, instead of being provided with three abutting parts 33 integrally formed at the housing 5. The other part is same as the first embodiment, and description of common parts will be omitted.

Figure 11:
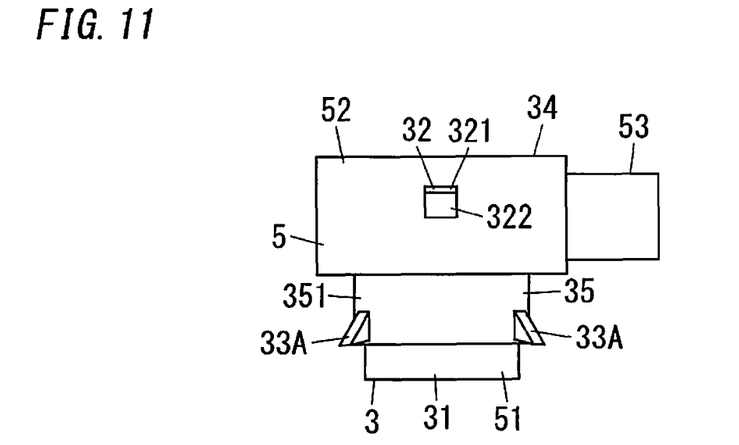
FIG. 11 is a front view showing a body block in an ultrasonic wave device according to a second embodiment.
Figure 14:
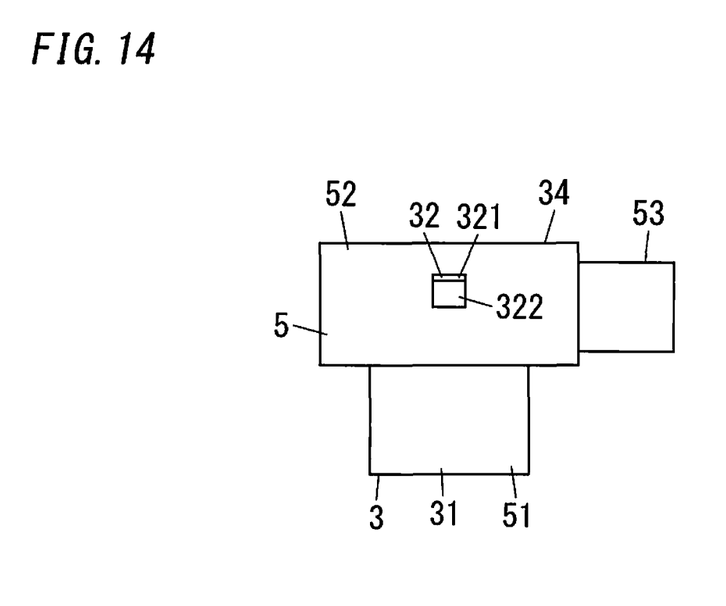
FIG. 14 is a front view showing a device body in the ultrasonic wave device according to the second embodiment.

In detail, a body block 3 includes a device body 34 and the abutting member 35. The device body 34 has a same configuration with the body block 3 in the first embodiment except that it does not include the abutting parts 33. The abutting member 35 includes the three abutting parts 33A and is connected with the device body 34. The abutting member 35 is formed from synthetic resin, for example.

Figure 12:
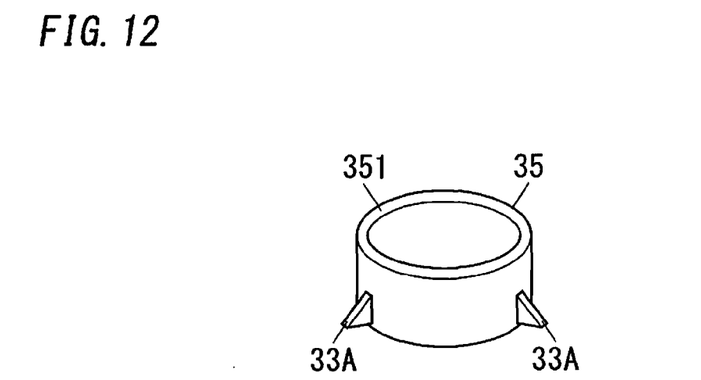
FIG. 12 is a perspective view showing an abutting member in the ultrasonic wave device according to the second embodiment.
Figure 13:
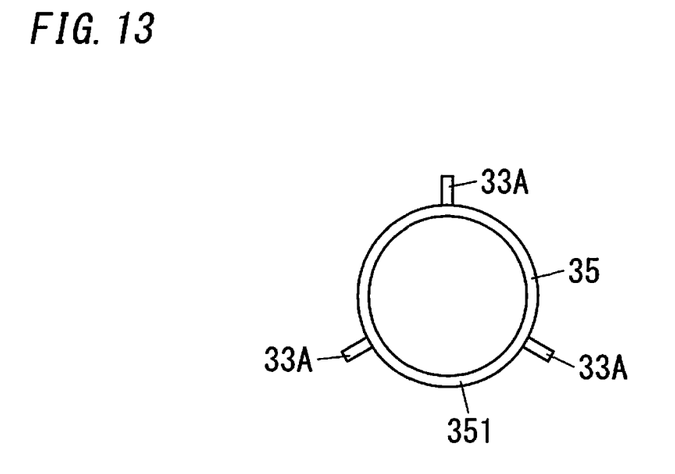
FIG. 13 is a plan view showing the abutting member in the ultrasonic wave device according to the second embodiment.

The abutting member 35 includes a fitting part 351 formed in a cylinder shape, and each of the abutting parts 33A is designed to project from an external peripheral surface of the fitting part 351. The abutting member 35 is connected with the device body 34 by having a microphone holding part 51 fitted into the fitting part 351. Although the abutting parts 33A are arranged at a lower end side of the fitting part 351 in an illustrated example, the fitting part 351 may project further downward from the abutting parts 33A and be inserted into an exposing hole 11. In this case, the fitting part 351 constructs part of a head 31.

According to the structure mentioned above, when with respect to a dimension from a lower end of each abutting part 33A to the exposed surface 30, a plurality of abutting members 35 having different dimensions are prepared in advance, it is possible to apply to plural kinds of bumpers 1. That is, it is possible to have the exposed surface 30 to be flush with the outer surface of each bumper 1, even to plural kinds of bumpers 1 having different thickness dimensions T1, without changing the device body 34 by choosing the abutting member 35 which has appropriate dimension according to a thickness dimension T1 of each bumper 1.

Further, in each of the embodiments mentioned above, although the bumper 1 is provided for an example as the vehicle outer panel to which the holding member 2 is fixed, it may be a grille to which the holding member 2 is to be fixed.

Moreover, in each of the embodiments mentioned above, other well-known methods such as gluing, welding and screwing may be used instead of using a sticking sheet 6 to fix the holding member 2. Further, when sticking with the sticking sheet 6, gluing, and welding are used together with screwing, it is possible to fix the holding member 2 more firmly.

As described above, this ultrasonic wave device includes: the holding member 2 designed to be fixed to an inner surface of the vehicle outer panel (for example, the bumper 1, the grille, or the like); and the body block 3 designed to be connected with the holding member 2. The body block 3 includes: the head 31 designed to be inserted in the exposing hole 11 which is a thorough hole provided at the vehicle outer panel; and at least one abutting part 33 (or 33A) designed to abut on the inner surface of the vehicle outer panel at a position closer to the exposing hole 11 than a position where the holding member 2 is fixed. The body block 3 further includes at least one of the receiving part and the transmitting part. The receiving part is provided at the head 31 and configured to receive ultrasonic waves incident from the exposed surface 30 which is exposed thorough the exposing hole 11. The transmitting part is provided at the head 31 and configured to transmit ultrasonic waves from the exposed surface 30. The holding member 2 includes the biasing part designed to bias the body block 3 to an outer side of the vehicle outer panel.

In this ultrasonic wave device, it is preferable that the at least one abutting part 33 (or 33A) is designed to abut on the vehicle outer panel only at part around the exposing hole 11.

In this ultrasonic wave device, it is preferable that the at least one abutting part 33 (or 33A) includes three abutting parts 33 (or 33A) or more. In this ultrasonic wave device, it is preferable that a surface of the at least one abutting part 33 (or 33A) abutting on the inner surface of the vehicle outer panel is formed in the curved surface.

In this ultrasonic wave device, it is preferable that the head 31 is formed in the columnar shape with the axial direction thereof oriented to a thickness direction of the vehicle outer panel, and the at least one abutting part 33 (or 33A) is designed to project from an external peripheral surface of the head 31.

In this ultrasonic wave device, it is preferable that portions of the three abutting parts 33 (or 33A) or more abutting on the vehicle outer panel are arranged at equal intervals on one circumference surrounding the head 31.

In this ultrasonic wave device, it is preferable that the holding member 2 includes a pair of clamping parts 24 and 24 as the biasing part designed to hold the body block 3 elastically. In this case, each of the pair of clamping parts 24 and 24 has the engagement hole 25. The body block 3 is provided with the engagement projection 32 designed to be engaged into the engagement hole 25, for each engagement hole 25. The engagement projection 32 includes the inclined surface (the first inclined surface 321) which is inclined so that the projecting dimension of the engagement projection 32 becomes smaller as a surface of the engagement projection 32 gets apart from the vehicle outer panel in the thickness direction of the vehicle outer panel. Each of the pair of clamping parts 24 and 24 is designed to bias the body block 3 to the outer side of the vehicle outer panel (a direction of the arrow A2) by elastically abutting on the inclined surface (the first inclined surface 321).

In this ultrasonic wave device, it is preferable that the holding member 2 is fixed to the vehicle outer panel by any one of laser welding, gluing, sticking with double sided tape, and screwing.

In this ultrasonic wave device, it is preferable that the holding member 2 is fixed to the vehicle outer panel by screwing and any one of laser welding, gluing, and sticking with double sided tape together.

In this ultrasonic wave device, it is preferable that the body block 3 includes the housing 5 including the at least one abutting part 33 integrally, and the housing 5 holds at least one of the receiving part and the transmitting part.

In this ultrasonic wave device, it is preferable that the body block 3 includes: the device body 34 including at least one of the receiving part and the transmitting part; and the abutting member 35 including the at least one abutting part 33A and designed to be connected with the device body 34.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An ultrasonic wave device comprising:
a holding member designed to be fixed to an inner surface of a vehicle outer panel; and
a body block designed to be connected with the holding member,
wherein the body block includes:
a head designed to be inserted in an exposing hole which is a through hole provided at the vehicle outer panel;
at least one abutting part designed to abut the inner surface of the vehicle outer panel at a position closer to the exposing hole than a position where the holding member is fixed; and
at least one of a receiving part and a transmitting part, the receiving part being provided at the head and configured to receive ultrasonic waves incident from an exposed surface which is exposed through the exposing hole, the transmitting part being provided at the head and configured to transmit ultrasonic waves from the exposed surface, and
wherein the holding member includes a biasing part designed to bias the body block to an outer side of the vehicle outer panel, and
the at least one abutting part is directly in contact with the inner surface of the vehicle outer panel only at part of the vehicle outer panel around the exposing hole.

2. The ultrasonic wave device as set forth in claim 1, wherein the at least one abutting part comprises three abutting parts or more.

3. The ultrasonic wave device as set forth in claim 1, wherein a surface of the at least one abutting part abutting on the inner surface of the vehicle outer panel is formed in a curved surface.

4. The ultrasonic wave device as set forth in claim 2, wherein a surface of the at least one abutting part abutting on the inner surface of the vehicle outer panel is formed in a curved surface.

5. The ultrasonic wave device as set forth in claim 1,
wherein the head is formed in a columnar shape with an axial direction of the head oriented to a thickness direction of the vehicle outer panel, and
the at least one abutting part is designed to project from an external peripheral surface of the head.

6. The ultrasonic wave device as set forth in claim 2,
wherein the head is formed in a columnar shape with an axial direction of the head oriented to a thickness direction of the vehicle outer panel, and
the at least one abutting part is designed to project from an external peripheral surface of the head.

7. The ultrasonic wave device as set forth in claim 3,
wherein the head is formed in a columnar shape with an axial direction of the head oriented to a thickness direction of the vehicle outer panel, and
the at least one abutting part is designed to project from an external peripheral surface of the head.

8. The ultrasonic wave device as set forth in claim 2, wherein portions of the three abutting parts or more abutting on the vehicle outer panel are arranged at equal intervals on one circumference surrounding the head.

9. The ultrasonic wave device as set forth in claim 1,
wherein the holding member includes, as the biasing part, a pair of clamping parts designed to hold the body block elastically, and
each of the pair of clamping parts has an engagement hole, and
the body block is provided with an engagement projection for each engagement hole, the engagement projection being designed to be engaged into the engagement hole, and
the engagement projection includes an inclined surface which is inclined so that a projecting dimension of the engagement projection becomes smaller as a surface of the engagement projection gets apart from the vehicle outer panel in the thickness direction of the vehicle outer panel, and
each of the pair of clamping parts is designed to bias the body block to the outer side of the vehicle outer panel by elastically abutting on the inclined surface.

10. The ultrasonic wave device as set forth in claim 1, wherein the holding member is fixed to the vehicle outer panel by any one of laser welding, gluing, sticking with double sided tape, and screwing.

11. The ultrasonic wave device as set forth in claim 1, wherein the holding member is fixed to the vehicle outer panel by screwing and any one of laser welding, gluing, and sticking with double sided tape together.

12. The ultrasonic wave device as set forth in claim 1, wherein the body block includes a housing including the at least one abutting part integrally, the housing holding at least one of the receiving part and the transmitting part.

13. The ultrasonic wave device as set forth in claim 1, wherein the body block comprising:

a device body including at least one of the receiving part and the transmitting part; and an abutting member including the at least one abutting part and designed to be connected with the device body.

* * * * *